US 6,725,628 B2

United States Patent
Lohrey et al.

(10) Patent No.: US 6,725,628 B2
(45) Date of Patent: Apr. 27, 2004

(54) PROCESS FOR THE CONTINUOUS PRODUCTION OF BEVERAGE FILTER BAGS

(75) Inventors: Wilhelm Lohrey, Meerbusch (DE); Stefan Lambertz, Hürth (DE); Wolfgang Groth, Wegberg (DE); Rolf Maier, Stuttgart (DE)

(73) Assignee: Teepack Spezialmaschinen GmbH & Co. KG (DE)

( * ) Notice: Subject to any disclaimer, the term of this patent is extended or adjusted under 35 U.S.C. 154(b) by 53 days.

(21) Appl. No.: 09/849,196

(22) Filed: May 4, 2001

(65) Prior Publication Data

US 2002/0005027 A1 Jan. 17, 2002

(30) Foreign Application Priority Data

May 11, 2000 (EP) .............................................. 00109939
Feb. 9, 2001 (EP) .............................................. 01103059

(51) Int. Cl.[7] .............................................. B65B 29/04
(52) U.S. Cl. .......................... 53/413; 53/414; 53/450; 53/435; 53/455; 53/134.2; 225/96.5
(58) Field of Search ......................... 53/413, 414, 415, 53/450, 455, 463, 134.1, 134.2, 435; 225/2, 96, 96.5, 100, 106; 211/113

(56) References Cited

U.S. PATENT DOCUMENTS

| | | | | |
|---|---|---|---|---|
| 2,335,159 A | * | 11/1943 | Salfisberg | 53/413 |
| 2,472,440 A | * | 6/1949 | Salfisberg | 53/415 |
| 2,987,857 A | * | 6/1961 | Whelan | 53/413 |
| 4,184,619 A | * | 1/1980 | Stewart et al. | 225/100 |
| 4,609,556 A | * | 9/1986 | Goedert | 53/134.2 |
| 5,135,762 A | * | 8/1992 | Vernon et al. | 53/413 |
| 5,284,259 A | * | 2/1994 | Conway et al. | 211/113 |
| 5,312,032 A | * | 5/1994 | Rautenberg et al. | 225/100 |
| 5,433,060 A | * | 7/1995 | Gur et al. | 53/134.1 |
| 5,460,844 A | * | 10/1995 | Gaylor | 53/134.2 |
| 5,689,936 A | * | 11/1997 | Kenney | 53/413 |
| 5,695,105 A | * | 12/1997 | Ohara | 225/100 |
| 6,286,690 B1 | * | 9/2001 | Thalenfeld | 211/113 |

FOREIGN PATENT DOCUMENTS

| | | |
|---|---|---|
| EP | 0 095 542 A | 12/1983 |
| EP | 0 186 867 A | 7/1986 |
| EP | 0 448 325 A | 9/1991 |
| WO | WO 93/07060 | 4/1993 |

* cited by examiner

*Primary Examiner*—John Sipos
*Assistant Examiner*—Louis Huynh
(74) *Attorney, Agent, or Firm*—Cantor Colburn LLP

(57) ABSTRACT

This invention relates to a process for the continuous production of beverage filter bags, especially tea bags with a hanging strip made from a carrier sheet material and with at least one pocket which consists of a filter material and is closed on all sides, contains at least one portion of a beverage substance, and is connected to the hanging strip; whereby individual beverage-substance portions are deposited in a row on a continuous web of filter paper, a sleeve is formed, at least one string of consecutive, contiguous pockets, each containing one portion of the substance, is produced by individually sealing them off with a transverse seam, said transverse seam including both the trailing seam of one pocket and the leading seam of the following pocket, with perforations between the two seams along which neighboring pockets can be separated in the course of the process; the individual pocket is separated from the string of pockets; the pocket separated from the string of pockets is connected to a hanging-strip supply string; and the hanging strip is separated from the hanging-strip supply string. For the separation of a pocket from the pocket string the continuously advancing pocket string is grasped at a predefined point near the perforation of the pocket to be separated and is subjected to an acceleration in the forward direction of the pocket string in such fashion that the relative movement causes the pocket to separate from the pocket string.

31 Claims, 3 Drawing Sheets

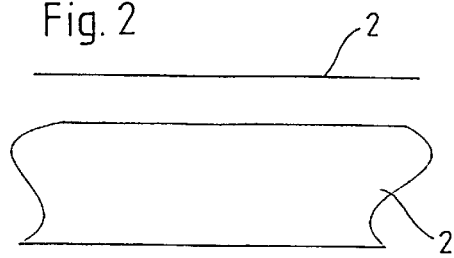
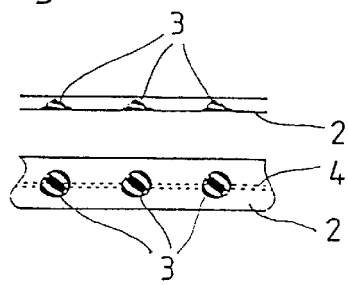
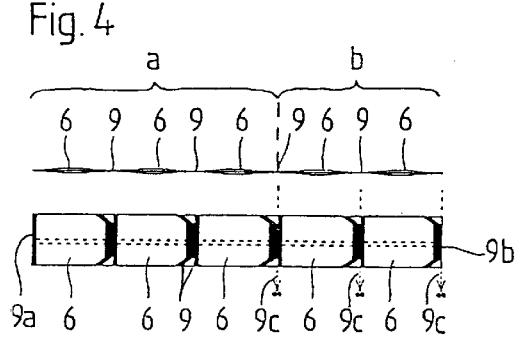
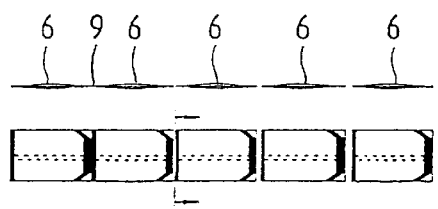
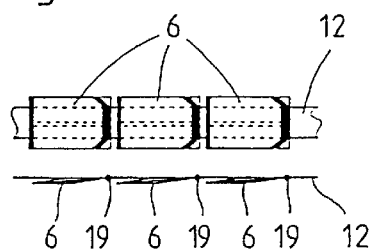
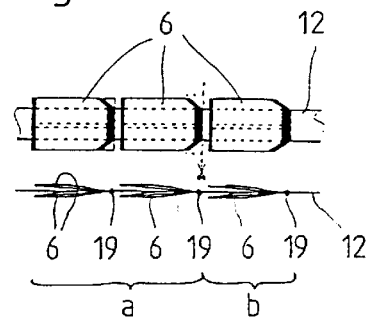
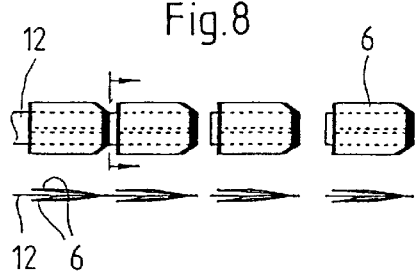
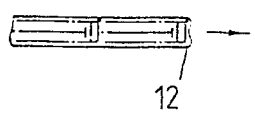

PROCESS FOR THE CONTINUOUS PRODUCTION OF BEVERAGE FILTER BAGS

FIELD OF THE INVENTION

This invention relates to a process for the continuous production of beverage filter bags, especially tea bags with a hanging strip made from a carrier sheet material and with at least one pocket which consists of a filter material and is closed on all sides, contains at least one portion of a beverage substance, and is connected to the hanging strip; whereby individual beverage-substance portions are deposited in a row on a continuous web of filter paper of which a sleeve is formed, a string of consecutive, contiguous pockets, each containing one portion of the substance, is produced by individually sealing them off with a transverse seam, said transverse seam including both the trailing seam of one pocket and the leading seam of the following pocket, with perforations between the two seams along which neighboring pockets can be separated in the course of the process; the individual pocket is separated from the string of pockets; the pocket separated from the string of pockets is connected to a hanging-strip supply string; and the hanging strip is separated from the hanging-strip supply string.

DESCRIPTION OF THE RELATED ART

Methods and systems for the continuous production of beverage filter bags and the filter bags thus produced have been in existence in numerous design variations. According to one such prior-art method, individual portions of an infusion substance are deposited on a continuous web of filter paper, a sleeve is formed, and by a transverse sealing process the sleeve is subdivided into individual pockets, each closed on all sides and each containing a portion of the substance. The sleeve can be produced by means of overlapping folds of the sheet of filter paper which are then sealed with a longitudinal seam, or by overlaying an additional sheet of filter paper and bonding the sheets with two longitudinal seams. The pockets are then attached to a hanging strip which permits manipulating and suspending the filter bag.

SUMMARY OF THE INVENTION

It is the objective of this invention to provide a simple process for the continuous production of filter bags of the type first above mentioned, which process operates reliably and at high speed and permits cost-effective production of the filter bags.

According to the invention, this is accomplished in that, for separating a pocket from the string of pockets, the continuously moving string of pockets is seized in a predetermined position near the perforation of the pocket to be separated and the forward speed of the string is accelerated in such fashion that the pocket is separated from the string by virtue of the relative movement.

An advantageous way to separate a pocket from the string of pockets is to guide the string of pockets to a continuously rotating wheel provided with recesses for individual pockets, where the longitudinal sides of the pocket to be separated from the string are seized by grippers laterally positioned next to the wheel and the relative movement between the grippers and the wheel causes the separation of the pocket from the string.

According to the invention, the pockets of the string of pockets are thus pulled apart at the perforation and individually separated. This separation process permits high-speed machine operation whereby in advantageous fashion 800 to 1500 and preferably 1000 to 1200 filter bags can be produced per minute. The grippers are advantageously designed to swivel in the direction of rotation of the wheel preferably via a cam mechanism which accelerates them in the direction of rotation of the wheel, thus producing the relative movement. In the forward movement of the string of pockets, a leading pocket to be separated is seized before the next following pocket is seized, and the leading pocket is accelerated at the moment the next following pocket is seized. In a further enhancement of the process of this invention, the forward grippers, as viewed in the direction of rotation of the wheel, seize a pocket that is to be separated from the string of pockets before the rearward grippers seize the next following pocket of the string, and the forward grippers are accelerated in the direction of rotation of the wheel as the rearward grippers seize the next following pocket of the string of pockets. The seizing movement of the grippers is preferably controlled by a cam mechanism.

In advantageous fashion the pockets, mutually spaced, are connected to the hanging-strip supply string. The inter-pocket spacing is produced as the pockets are pulled apart by the relative movement between the grippers and the wheel during the process of separating an individual pocket from the string of pockets. The pockets, preferably spaced apart by a few millimeters, adjoin the hanging-strip supply string so that the individually separated pockets are attached to a section of the hanging-strip supply string that corresponds to an elongated inter-pocket separation gap and will ultimately constitute the hanging strip of the filter bag. In another design enhancement, the spacing-dependent section length is augmented by advancing the hanging-strip supply string to the wheel at a faster rate than the string of pockets.

In an advantageous implementation of this invention, the pockets are held in the recesses of the wheel during the separation process, preferably by vacuum suction. The process thus provides for the individual pockets of the string of pockets to be positioned and locked in place in the recesses of the wheel. This also results in a uniform portioning of the substance in the pockets. As another advantageous aspect of the invention, the pockets are pushed or preferably blown out of the recesses in the wheel either concurrently with or following their attachment to the hanging-strip supply string. This makes certain that the pockets do not stick in the recesses of the wheel which would otherwise impede or interfere with the production flow.

The transverse seam is advantageously produced by fusion, preferably employing ultrasound. The perforation between the two transverse seams is best produced concurrently with or following the generation of the transverse seam, preferably by ultrasound concurrently with the transverse seam. The process according to this invention thus ensures a consistently identical transverse-seam geometry which significantly simplifies operation. In another advantageous form of implementation of the invention, the perforation is produced after the sealing of the transverse seam, using at least one rotating blade with a multigapped edge. The separate perforating operation extends the life and improves the quality of the ultrasound-generated transverse seam.

In advantageous fashion, the hanging-strip supply string for the filter bags is guided to the wheel during the course of the process and the pocket separated from the pocket string is attached to it by fusion bonding, preferably via ultrasound, either concurrently with or following the separation.

In a particularly desirable enhancement of the process of this invention, each one pocket from two pocket strings is bonded to the hanging strip at one common edge, with one of the pockets from a first pocket string being attached, along a suitably formed edge, to one side of the hanging-strip supply string and one of the pockets of a second pocket string being attached, along a suitably formed edge, to the opposite side of the hanging-strip supply string. Preferably in a first step one of the pockets of a first pocket string is bonded along a suitably formed edge to one side of the hanging-strip supply string and subsequently one of the pockets of a second pocket strip is bonded along a suitably formed edge to the opposite side of the hanging-strip supply string.

In an advantageous implementation of this invention, the pockets that are attached to the hanging-strip supply string are transported in that the hanging-strip supply string is grasped at specific points and pulled in the forward direction. In advantageous fashion the hanging-strip supply string is grasped at the point at which it connects to the pockets, preferably at the connecting point of every other pocket and most preferably at the connecting point of every fourth pocket. Advantageously, conveyance is provided by means of a belt equipped with mutually spaced cams which grasp the hanging-strip supply string and transport it by virtue of the movement of the belt.

A particularly advantageous design of this invention employs for the conveyance a controlled dual-belt system whereby in alternating fashion the cams of one belt move the hanging-strip supply string while the cams of the second belt are set in the transport position for the subsequent forwarding operation. According to a particularly advantageous concept of the invention, the movement of the belt is index-controlled, with the indexing flags or markers preferably positioned on the hanging-strip supply string. The pockets are advantageously attached to the hanging-strip supply string in the area of the indexing markers whereby, after a pocket is attached, the point of attachment of the pocket to the hanging-strip supply string is used to control the movement of the belt, thus indirectly constituting a quasi index-controlled system. Using a controlled and especially index-controlled dual belt system permits absolute positional precision in the movement of the hanging-strip supply string with pockets attached. This compensates for and eliminates any offset in terms of the proper positioning of a pocket on the hanging-strip supply string which could otherwise be a problem typically associated with the tolerances and deviations inherent in dual belt systems with spaced cams. In the process of this invention, a first belt of the dual-belt system, index-controlled via servo motors, moves into its transport position and jogs the hanging-strip supply string with pockets a specific distance. During that time the transport cams of the second belt are disengaged, to be brought into their forwarding position at just the right time for the further advance of the pocket-carrying hanging-strip supply string. Meanwhile, the speed of the second belt is regulated via servo motors which detect index markers on the hanging-strip supply string for instance with the aid of an optical sensor, causing an appropriate speed adjustment of the second belt which in turn brings the cams of the second belt into their transport position, grasping and moving the hanging-strip supply string with the attached pockets. As soon as the pocket-carrying hanging-strip supply string is grasped by the cams of the second belt, the cams of the first belt are disengaged and moved into their next grasping position.

For separating the hanging-strip section for the individual filter bag from the hanging-strip supply string, the supply string is suitably perforated at the point of the pocket connection, grasped in a predefined position near the perforation and subjected to an acceleration in the forward direction of the hanging-strip supply string in such fashion that due to the relative movement the hanging strip of the respective filter bag is separated from the hanging-strip supply string. In advantageous fashion the hanging-strip supply string is guided to a continuously rotating wheel in the process of which the supply strip is seized by grippers on the wheel, whereby the relative movement between the grippers and the wheel causes the hanging strip of the filter bag thus produced to separate from the supply string. For separating the hanging strip from the supply string the grippers, having seized the hanging-strip supply string, are suitably swiveled in the direction of rotation of the wheel and are accelerated in that direction preferably by means of a cam mechanism. The seizing operation as well is advantageously cam-controlled.

BRIEF DESCRIPTION OF THE DRAWINGS

In advantageous fashion, the forward part of the transversal seam of the pockets is essentially V-shaped. As another feature of this invention, when the hanging-strip supply string is perforated in the area of the connecting point between the supply string and the respective pocket, two corners of the pocket are punched out to the left and right of a center ridge. This produces filter bag tops with a special, uniform configuration.

Further details, features and advantages of this invention are explained with the aid of the implementation example illustrated in the attached drawings in which

FIGS. 2 to 9 each represent a side view and, respectively, top view of the product generated with the system employing the process, at the points marked in FIG. 1.

DETAILED DESCRIPTION OF THE PREFERRED EMBODIMENT

Figure 1:
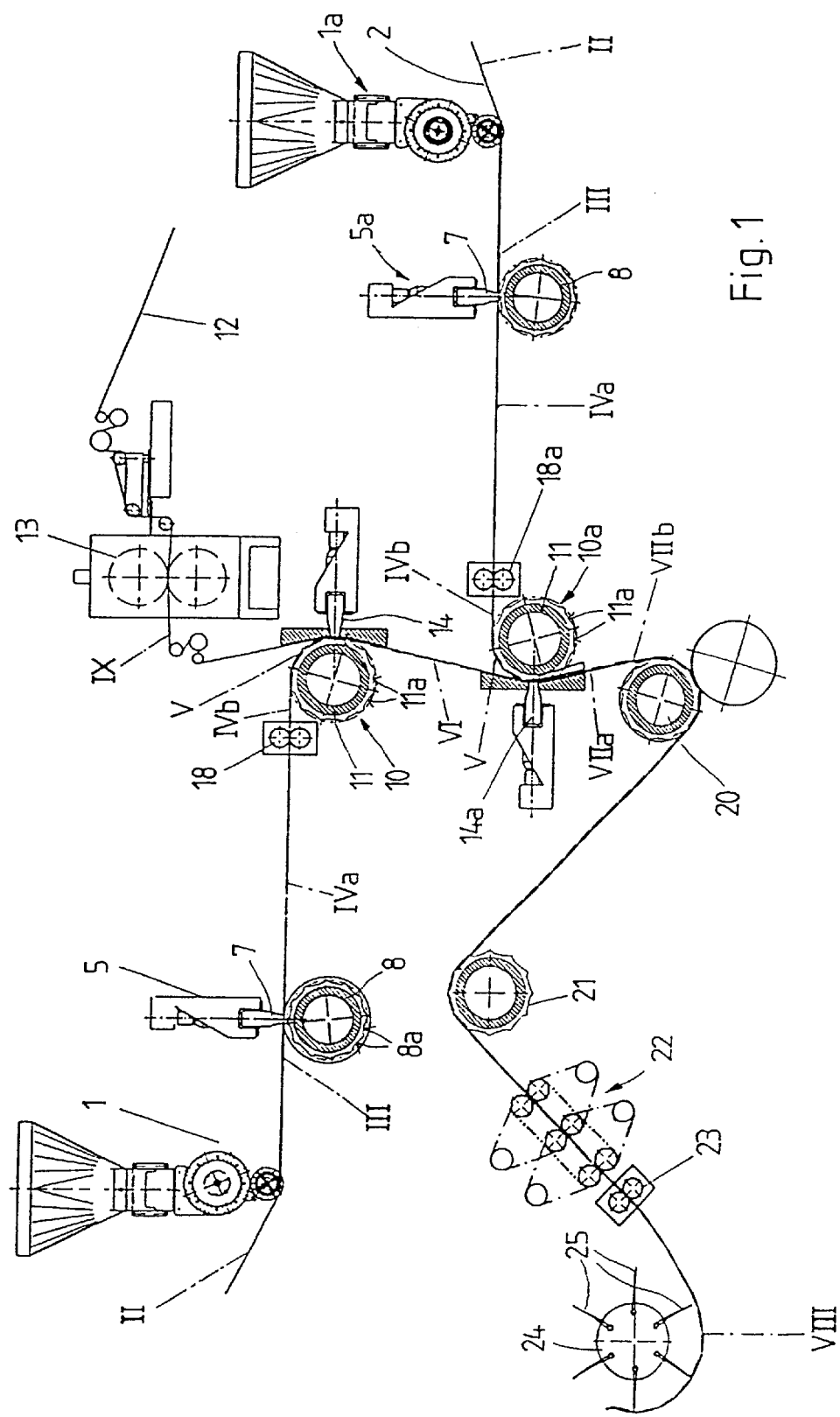
FIG. 1 is a schematic illustration of a system for implementing a process according to this invention.

The system as schematically illustrated in FIG. 1 for implementing the process includes a metering unit 1 which deposits on a continuous sheet of filter paper 2, shown in FIG. 2, individual beverage-substance portions 3 as shown in FIG. 3, forms a continuous sleeve by longitudinally folding and overlapping the sheet of filter paper 2, and seals the sleeve with a longitudinal seam 4 outlined in FIG. 3.

In a transverse-sealing station 5 the sleeve is subdivided into pockets 6 which are closed on all sides. This is accomplished through ultrasound bonding by means of a sonotrode 7 whose action is coordinated with that of a sealing roller 8. The sealing roller 8 is provided with recesses 8a accommodating the substance portion 3 contained in each pocket 6 and rotates at a speed that corresponds to the rate at which the continuous web of filter paper 2 is advanced.

As can be seen in FIG. 4, the transverse seal consists of a double seam 9 comprising a trailing seam 9a and a leading seam 9b. Between these seams 9a and 9b a perforation is produced by a horizontal perforating station 18. The area marked "a" in FIG. 4 shows the pocket string before, the area marked "b" in FIG. 4 shows the pocket string after the perforating operation.

Figure 10:
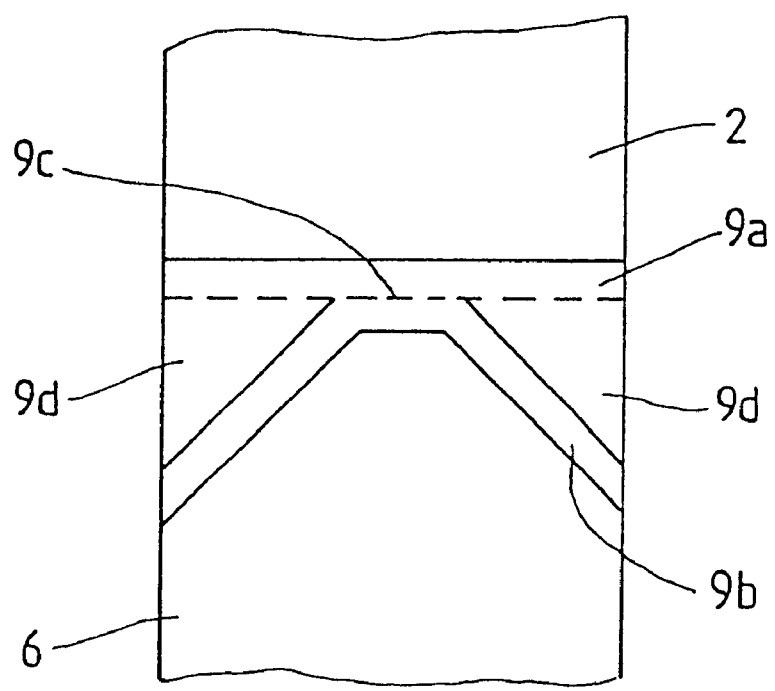
FIG. 10 is an enlarged view of a dual seam.

FIG. 10 is an enlarged illustration of the dual seam 9 produced by ultrasound fusion, with the trailing seam 9a at the rearward end of one pocket 6 and the leading seam 9b at the forward end of the next following pocket, with the perforation 9c in between the two seams 9a and 9b. In the case shown, the dual seam 9 separates two triangular corners 9d from the filter paper of the pocket 6, which are punched out during the course of the process on either side of the center ridge of the forward seam 9b. The perforation 9c extends over the full width of the pocket 6. The forward seam 9b which constitutes the head section of the filter bag is essentially V-shaped, with the center ridge constituting the apex.

The string of pockets, composed of the continuous web of filter paper 2 subdivided into individual pockets 6, is now fed into a pocket separating station 10 in which the pockets 6 are pulled apart and separated along the perforation 9c. This is accomplished by means of a wheel 11 with which the pocket separating station 10 is provided and which features recesses 11a designed to accept individual pockets 6. Grippers positioned on the side of the wheel 11 seize the pockets 6 of the pocket string and separate them one-by-one through the relative movement between the grippers and the wheel 11. To that end, the grippers which are pivot-mounted to swivel in the direction of rotation of the wheel 11 are accelerated via a cam mechanism so as to generate the relative movement in the direction of rotation of the wheel 11. Another cam on the wheel 11 controls the seizing operation of the grippers. The cam mechanisms are mutually adjusted in such fashion that the forward grippers, viewed in the direction of rotation of the wheel 11, seize a pocket 6 that is to be separated before the rearward grippers seize the next following pocket 6, while the forward grippers, again viewed in the direction of rotation of the wheel 11, are accelerated as the rearward grippers seize the next following pocket 6 of the pocket string.

FIG. 5 shows part of the pocket string that is fed into the pocket separating station 10, with the central pocket 6 being separated from the next following pocket 6 of the pocket string. The pockets 6 on the right in FIG. 5 have already been separated and the grippers of the rotating wheel 11 are feeding them past a sonotrode 14 positioned in another location at the wheel 11 where the pockets 6 are attached to a circulating hanging-strip supply string 12. The pockets 6 of the pocket string shown on the left side of FIG. 5 are already in the process of being grasped by the grippers of the wheel 11. The arrows pointing to the right in FIG. 5 in the area of the rearward seam 9a of the central pocket 6 indicate the accelerated movement of the grippers and thus of the central pocket 6 as it is headed for separation. As can be seen in FIG. 1, the hanging-strip supply string 12 is guided toward the wheel 11 and is cut lengthwise in a pass-through station 13 and perforated as shown in FIG. 9. By means of the ultrasound bonding sonotrode 14 the separated pockets 6 are connected in the area of the central ridge of the leading seam 9b to the hanging-strip supply string 12 as illustrated in FIG. 6. Thus, as shown in FIG. 6, a number of pockets 6 are attached to one side of the hanging-strip supply string 12 in equidistant locations relative to one another, in the case illustrated at bonding points 19.

FIG. 1 shows schematically that a metering device 1a deposits beverage-substance portions on another web of filter paper 2 and that the filter paper 2 forms a sleeve which in an additional horizontal bonding station 5a is subdivided into individual pockets 6. In this horizontal bonding station 5a as well, a sonotrode 7 and a sealing roller 8 produce a dual seam 9 by ultrasound, with a trailing seam 9a and a leading seam 9b. In a transverse-perforating station 18a the area of the dual seam 9 between the trailing seam 9a and the leading seam 9b is provided with a perforation 9c. Thus, at the point marked IVb, there will now be another pocket string which is fed to a pocket separating station 10a similar to the pocket separating station 10. In this pocket separating station 10a the pockets 6 of the second pocket string are on their part guided to a continually rotating wheel 11, provided with recesses 11a for accepting individual pockets 6, while the longitudinal sides of the pockets 6 which are to be separated from the pocket string are grasped by grippers mounted on the side of the wheel 11, the relative movement between the grippers and the wheel 11 causing a target pocket 6 to be separated from the pocket string. In corresponding fashion, the individually separated pockets 6 of the second pocket string are ultrasound-bonded by a sonotrode 14a to the free side of the hanging-strip supply string 12 in the area of the central ridge of its leading seam 9b. At the point marked VIIa, as shown in FIG. 7, there will be a hanging-strip supply string 12, to both sides of which pockets 6 have been attached at bonding points 19. The pocket string thus bilaterally carrying pockets 6 is guided to a punching station 20 consisting of a continuously rotating wheel equipped at its perimeter with punching dies. They serve to punch out two triangular corners 9d on either side of the central ridge of the leading seam 9b of the pockets 6.

An index-controlled dual belt system 22 whose belts feature mutually spaced cams for driving the hanging-strip supply string 12, moves the hanging-strip supply string 12 and the pockets 6 it carries on both sides, via a guide roller 21. In alternating fashion, the cams of one belt drive the hanging-strip supply string 12 while the cams of the other belt move into position for taking over the further transport. Controlled by index markers and driven by servo motors, the first belt of the dual belt system 22 moves into its transport position and jogs the hanging-strip supply string, carrying pockets 6, a certain distance. During that cycle the drive cams of the second belt are disengaged, to be brought into their transport position in time to take over the further movement of the hanging-strip supply string 12 carrying the pockets 6. In the process, the servo motors regulate the speed of the second belt, with an optical sensor scanning index markers on the hanging-strip supply string 12 for controlling the speed of the second belt, so that the cams of the second belt are brought into their transport position for grasping and driving the hanging-strip supply string 12. As soon as the cams of the second belt engage in the hanging-strip supply string 12 with its pockets 6, the cams of the first belt disengage and are moved into their ready-position for the next engagement.

Finally, the hanging-strip supply string 12, carrying pockets 6 on both sides, is guided toward a transverse perforating station 23 where the hanging-strip supply string is perforated between the mutually spaced consecutive pockets 6.

Following the transverse perforation in the transverse perforating station 23, the hanging-strip supply string 12, carrying pockets 6 on both sides, moves toward a continuously rotating wheel 24 where grippers 25 on the wheel 24 grasp the hanging-strip supply string 12 and pull it apart at the perforations by means of a relative movement between the grippers 25 and the wheel 24. The grippers grasp the hanging-strip supply string near the leading seam 9b of the pockets 6, the forward grippers, as viewed in the direction of rotation of the wheel 24, are accelerated as soon as the rearward grippers, again as viewed in the direction of rotation of the wheel, have grasped the hanging-strip supply string 12 in the area of the succeeding pockets 6. Both the generation of the relative movement and the grasping operation by the grippers 25 are controlled by separate, appropriately synchronized cam mechanisms associated with the wheel 24.

What is claimed is:

1. A process for the continuous production of beverage filter bags, the process comprising the steps of:
   providing a continuous sheet of filter paper;
   depositing individual beverage-substance portions in at least one row on said continuous sheet of filter paper;
   forming a sleeve of said continuous sheet of filter paper and providing a longitudinal seam for closing the sleeve;
   producing a pocket string of consecutive, contiguous pockets of said sleeve by providing transverse seams, each of said transverse seams including both, a trailing seam for a previous pocket of said pocket string in respect to the transverse seam and a leading seam for that pocket of said pocket string that is following said previous pocket thereby sealing individually each of said pockets so that the pockets are closed on all sides and each contains at least one portion of said beverage substance;
   producing perforations between said two seams of said transverse seam;
   guiding the pocket string to a continuous rotating wheel having recesses for individual pockets;
   seizing longitudinal sides of the pockets to be separated from said pocket string by grippers position on a side of the wheel;
   providing a relative movement between the grippers and the wheel whereby separating the pocket from the pocket string
   providing a hanging-strip supply string made of a carrier sheet material;
   connecting each of said pockets seperated from the pocket string to a hanging-strip supply string; and
   separating the hanging strip from the hanging-strip supply string.

2. The process as in claim 1, wherein forward grippers, viewed in a direction of rotation of the wheel, grasp the pocket to be separated before rearward grippers, again viewed in the direction of rotation, grasp a next following pocket and the forward grippers are accelerated as the rearward grippers grasp the next following pocket of the pocket sting.

3. The process as in claim 2, wherein the grasping operation of the grippers is controlled by a cam mechanism.

4. The process as in claim 1, wherein during the separating operation the pockets are held in place in the recesses of the wheel.

5. The process as in claim 1, wherein, concurrently with or following connection to the hanging-strip supply string, the pockets are pushed out of the recesses of the wheel.

6. The process as in claim 1, further comprising feeding to the wheel the hanging-strip supply string from which in the course of the process the hanging strip for each filter bag is produced and to which the pocket to be separated is attached, concurrently with or following the separation, by fusion bonding.

7. The process as in claim 1, further comprising:
   perforating the hanging-strip supply string; and
   grasping the hanging-strip supply string at a predefined point near the perforation,
   wherein the hanging-strip supply string is guided to a continuously rotating wheel, grippers on the wheel grasp the hanging-strip supply string and a relative movement between the grippers and the wheel causes the hanging strip of the filter bag thus produced to be separated from the hanging-strip supply string.

8. The process as in claim 7, wherein, for separating the hanging strip from the hanging-strip supply string after having grasped the hanging-strip supply string, the grippers are swiveled in a direction of rotation of the wheel.

9. The process as in claim 7, wherein the grippers are accelerated in a direction of rotation of the wheel.

10. The process as in claim 9, wherein the grippers are accelerated by a cam mechanism.

11. The process as in claim 1, wherein the transverse seam is produced by fusion bonding.

12. The process as in claim 1, wherein the perforation between the two seams of the transverse seam is produced concurrently with or following the formation of the transverse seam.

13. The process as in claim 1, wherein the perforation is produced by an ultrasound device.

14. The process as in claim 13, wherein the perforation is produced concurrently with the transverse seam.

15. The process as in claim 1, wherein the perforation is produced by at least one rotating blade with an intermittent cutting edge.

16. The process as in claim 1, wherein at a distance from one another the pockets are connected to the hanging-strip supply string.

17. The process as in claim 16, wherein the hanging-strip supply string is fed to the wheel at a faster rate than the pocket string.

18. The process as in claim 1, further comprising the step of:
   grasping the hanging-strip supply string at specific positions; and
   pulling the hanging-strip supply string in a forward direction for transporting the pockets connected to the hanging-strip supply.

19. The process as in claim 18, wherein grasping the hanging-strip supply string includes grasping in an area of the connection with the pockets.

20. The process as in claim 18, wherein grasping the hanging-strip supply string includes grasping in an area of the connection with every other pocket.

21. The process as in claim 18, wherein transporting the pocket includes using a cam-equipped belt whose cams grasp the hanging-strip supply string and drive the hanging-strip supply string in a forward direction.

22. The process as in claim 18, wherein transporting the pocket includes using a controlled dual belt system by alternating first cams of a first belt, which are brought into a grasping position and grasp the hanging-strip supply string, as second cams of a second belt are driving the hanging-strip supply string.

23. The process as in claim 22, wherein the belt movement is controlled by index markers which index markers are positioned on the hanging-strip supply string.

24. The process as in claim 18, wherein the hanging-strip supply string is grasped in an area of the connection with every fourth pocket.

25. The process as in claim 1, wherein the hanging-strip supply string is perforated in an area of connection to the pockets.

26. The process as in claim 25, further comprising:
   perforating the hanging-strip supply string; and
   grasping the hanging-strip supply string at a predefined position near the perforation,
   wherein the hanging-strip supply string is subjected to an acceleration in a forward direction of the hanging-strip supply string in such fashion that a resulting relative movement causes the hanging strip of the filter bag thus produced to be separated from the hanging-strip supply string.

27. The process as in claim 1, further comprising the step of:
punching out two corners being essentially V-shaped in respect to either side of a central ridge of said pockets and saidleading seam of said transverse seam of said pockets.

28. The process as in claim 1, wherein the transverse seam is produced by ultrasound.

29. The process as in claim 1, wherein forming the sleeve includes:
folding the sheet of filter paper so that there are overlapping folds of the sheet of filter paper; and
sealing the overlapping folds to form a longitudinal seam.

30. The process as in claim 1, wherein forming the sleeve includes:
overlaying a second sheet of filter paper over the sheet of filter paper; and
bonding the sheet of filter paper with the second sheet of filter paper with two longitudinal seams.

31. A process for the continuous production of beverage filter bags, the process comprising the steps of:
providing a first continuous sheet of filter paper;
depositing individual beverage-substance portions in at least one row on said first continuous sheet of filter paper;
forming a first sleeve of said first continuous sheet of filter paper and providing a longitudinal seam for closing the first sleeve;
providing a second continuous sheet of filter paper;
depositing individual beverage-substance portions in at least one row on said second continuous sheet of filter paper;
forming a second sleeve of said second continuous sheet of filter paper and providing a longitudinal seam for closing the second sleeve;
producing a pocket string of consecutive, contiguous pockets of said sleeves by providing transverse seams, each of said transverse seams including both, a trailing seam for a previous pocket of said pocket string in respect to the transverse seam and a leading seam for that pocket of said pocket string that is following said previous pocket thereby sealing individually each of said pockets so that the pockets are closed on all sides and each contains at least one portion of said beverage substance;
producing perforations between said two seams of said transverse seam;
guiding the pocket string to a continuous rotating wheel having recesses for individual pockets;
seizing longitudinal sides of the pockets to be separated from said pocket string by grippers position on a side of the wheel;
providing a relative movement between the grippers and the wheel whereby separating the pocket from the pocket string;
providing a hanging strip supply string made of a carrier sheet material the hanging strip supply string having a first and a second side;
connecting each of said pockets separated from the first pocket string to said first side of said hanging-strip supply string;
connecting each of said pockets separated from the second pocket string to said second side of said hanging-strip supply string; and
separating the hanging strip from the hanging-strip supply string.

* * * * *